June 7, 1960  J. A. BITEL  2,939,728
PIPE COUPLING HAVING A CAM OPERATED COUPLER
TO ENGAGE A RESILIENT RING
Filed Jan. 10, 1957
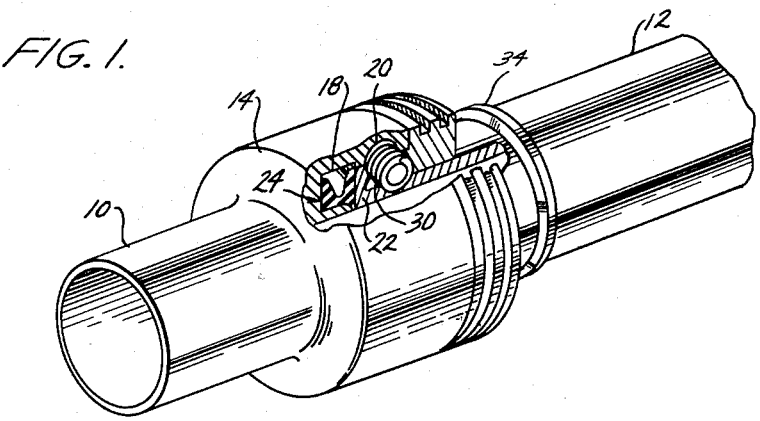
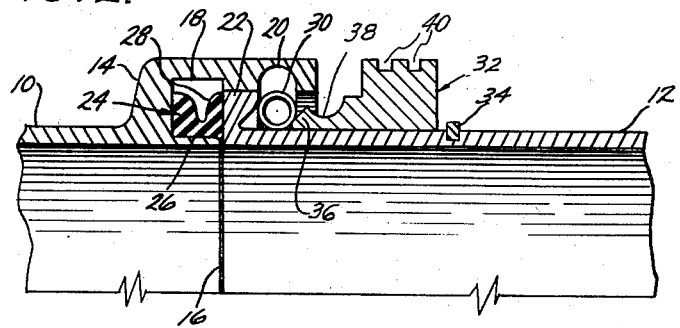
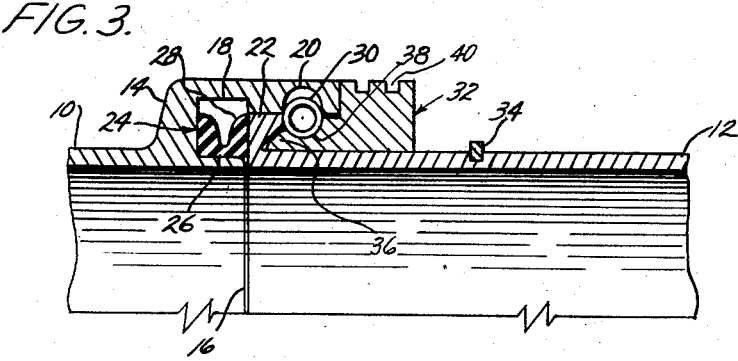
INVENTOR.
JOSEPH A. BITEL
BY
Teller & McCormick
ATTORNEYS

United States Patent Office 2,939,728
Patented June 7, 1960

2,939,728

PIPE COUPLING HAVING A CAM OPERATED COUPLER TO ENGAGE A RESILIENT RING

Joseph A. Bitel, Rockville, Conn., assignor to The Preferred Engineering and Research Corporation, Suffield, Conn., a corporation of Connecticut Filed Jan. 10, 1957, Ser. No. 633,428

6 Claims. (Cl. 285—315)

This invention relates to a coupling device for connecting the ends of cylindrical elements and, more specifically, to a quick disconnect coupling which can be used to particular advantage in connecting hose and pipes or the like which may comprise vacuum conduits or conduits for fluid under pressure.

It is the general object of the invention to provide a sturdy but extremely simple and economical quick disconnecting coupling which is particularly adapted to accommodate a seal and which requires a minimum of relatively movable elements to effect a connection or a disconnection.

More specific objects of the invention as well as advantages thereof will become apparent to those skilled in the art from the following detailed description having reference to the attached drawing wherein, by way of preferred example only, one specific embodiment of the invention is shown and wherein, Fig. 1 is a perspective view of two interconnected pipe sections which are particularly adapted in accordance with the present invention to provide a quick disconnect coupling, a portion of the coupling being shown in cross section to illustrate details;

Fig. 2 is a fragmentary longitudinal cross-sectional view of the coupling shown in Fig. 1, showing the pipe elements engaged but not interconnected; and Fig. 3 is a view similar to Fig. 2 showing the pipe elements engaged and interconnected.

In accordance with the present invention, two cylindrical elements which are to be connected together in end to end relationship have their connecting ends particularly adapted for that purpose and only two additional coupling elements are required to provide the desired interconnection. More specifically, one of the cylindrical elements is provided with a radially outwardly and forwardly extending boss or flange at one of its ends and the said flange is counterbored to receive in close sliding relationship an outwardly extending flange on the end of the other element to be connected. An annular radially expansible keying element is carried by the said other element along with a ring or sleeve which is axially movable to engage the keying element for the purpose of expanding and retaining it in nested engagement with the forwardly extending portion of the flange or boss on the first mentioned cylindrical element. If the cylindrical elements to be interconnected comprise hose or pipe sections wherein it is necessary to have a sealed connection, provision is made to retain a seal within the radially and forwardly extending boss on one element for engagement with the adjacent end of the other element.

In the various views of the drawing, the elements to be coupled together are shown to be two pipe sections 10 and 12. The pipe section 10 has a boss or flange 14 which projects radially outwardly and then forwardly to extend beyond its open end 16 which is to be connected with the open end of the pipe section 12. The said radially and forwardly extending boss 14 is counterbored to define an annular chamber 18 around the open end 16 of the pipe and in the radially projecting portion of the boss, and the forwardly extending portion of the said boss is bored to a greater diameter than the pipe diameter. An annular groove 20 is cut into the inner surface of the forwardly extending portion of the boss to receive a radially expansible keying element as will be described. The counterbored annular chamber 18 is provided to receive an annular seal as will also be described hereinafter.

The other pipe section 12 has a radially outwardly extending flange 22 on its end, the said flange being adapted for a close sliding fit within the bore of the forwardly extending portion of the boss on the pipe section 10. As shown in the drawing, the flange 22 overlies the annular chamber 18 at the end of the pipe section 10 whereby to compress an annular seal 24 within the said chamber. Obviously, the seal 24 can be of any suitable cross-sectional configuration, but, preferably, the said seal has a cylindrical wall 26 and two spaced apart radially extending end flanges 28, 28. If the conduit formed by the interconnected pipe sections 10 and 12 is to carry fluid under pressure, the seal is preferably of such form that the end flanges 28, 28 extend radially inwardly from the cylindrical wall 26 so that the fluid pressure will force the said flanges against the end wall of the annular chamber 18 and against the flange 22 on the pipe section 12. If the interconnected pipe sections 10 and 12 are to provide a vacuum conduit, the seal 24 is preferably of such form that its end flanges 28, 28 extend radially outwardly from its cylindrical wall 26 as shown. In either event, the axial or longitudinal dimension of the seal 24 should be slightly greater than the longitudinal dimension of the annular chamber 18 so that the flange 22 will place the seal 24 under compression to provide greater seal efficiency.

As previously mentioned, the pipe section 12 carries an annular, radially expansible keying element. In preferred form, the key device comprises an annular spring 30 which can conveniently be formed by joining the ends of a conventional coil spring of suitable length. The annular spring 30 surrounds and snugly embraces the pipe section 12 rearwardly of its end flange 22. That is, the spring is preferably provided in such size that it must be slightly expanded to surround the pipe. The annular spring is expanded further to engage within the groove 20 in the counterbored boss 14 by means of an expanding and locking ring or sleeve 32. The sleeve 32 surrounds the pipe section 12 and is freely slidable thereon between the flange 22 and a split ring 34 which is secured in a suitable groove in the pipe section 12 to provide a stop which limits the movement of the sleeve.

The sleeve 32 is adapted for the purpose of expanding the annular spring 30 by being provided with a tapered front end portion 36 which is engageable with the spring and which will cause it to be expanded radially outwardly as the sleeve 32 is advanced toward the flange 22. In being expanded radially, the spring 30 is thrust into the annular groove 20 in the end of the pipe section 10 until the forwardly projecting portion 36 of the sleeve passes beyond the spring. Then, the spring is permitted to contract into an annular groove 38 on the sleeve. It will be observed that the annular grooves 20 and 38 are complementary to each other and are so arranged that each groove will retain a portion of the annular spring 30 when it is permitted to contract into the groove 38. More specifically, the external groove 38 is arranged to cooperate with the flange 22 on the pipe section 12 to support the expanded spring 30 so that at least one-half of its cross-section is disposed outside of the internal groove 20 in the locked condition of the coupling. The nested disposition of the annular spring 30 provides the connection between the pipe sections 10 and 12 which will retain the said sections in end to end engagement as shown in the drawing. That is, when the spring 30 is disposed as described and as best shown in Fig. 3, it is in the full sense of the term a "key" preventing relative movement between the pipe sections 10 and 12. Before such sections could be moved from the position shown in Fig. 3, the spring 30 would have to be sheared between the outer edge of the annular groove 20 and the outer edge of flange 22.

Obviously, the pipe sections can quickly and easily be disconnected, but only after the ring or sleeve 32 has been pulled away from the end of the pipe section 12. In so doing, the spring 30 will be thrust radially outwardly into the groove 20 until the sleeve portion 36 is withdrawn and then the spring will be permitted to contract upon the pipe. In order to facilitate axial movement of the expander and locking sleeve 32, it is provided with a plurality of peripheral grooves 40, 40 to provide a better friction grip on an enlarged portion of the said sleeve. The said enlarged portion is disposed closely adjacent or in engagement with the end of the forwardly extending portion of the boss on the pipe section 10 when the pipe sections are connected.

The invention claimed is:

1. A quick disconnect coupling for securing the ends of two pipe sections or the like and comprising means providing a flange on one section which has a radially outwardly projecting portion adjacent the end of said one section and a portion projecting forwardly of the said end, the forwardly projecting portion of the flange having an inner diameter greater than the diameter of the sections and being provided with an internal annular groove, means on the other of said sections providing a radially outwardly projecting flange on the end of the section which flange is slidable within the forwardly projecting portion of the flange on the said one section toward engagement with the said end of the said one section, an annular radially expansible keying device embracing said other section adjacent its flange, and a longitudinally movable sleeve on said other section which is adapted to engage and expand the key device and which is provided with an external annular groove arranged to cooperate with the flange on said other section to support the expanded keying device partly within the said internal annular groove but with at least one-half of the cross-section of the keying device disposed outside of the said internal annular groove to prevent relative movement of the two pipe sections until the sleeve is disengaged from the keying device.

2. A quick disconnect coupling for securing the ends of two pipe sections or the like and comprising means providing a flange on one section which has a radially outwardly projecting portion adjacent the end of said one section and a portion projecting forwardly of the said end, the forwardly projecting portion of the flange having an inner diameter greater than the diameter of the sections and being provided with an internal annular groove, means on the other of the said sections providing a radially outwardly projecting flange on the end of the section which flange is slidable within the forwardly projecting portion of the flange on the said one section toward engagement with the said end of the said one section, an annular coil spring embracing said other section adjacent its flange, and a longitudinally movable sleeve on said other section which is adapted to engage and expand the spring and which is provided with an external annular groove arranged to cooperate with the flange on said other section to support the expanded spring partly within the said internal annular groove but with at least one-half of the cross-section of the spring disposed outside of the said internal annular groove to prevent relative movement of the two pipe sections until the sleeve is disengaged from the spring.

3. A quick disconnect coupling for securing the ends of two pipe sections or the like and comprising means providing a flange on one section which has a radially outwardly projecting portion adjacent the end of said one section and a portion projecting forwardly of the said end, the forwardly projecting portion of the flange having an inner diameter greater than the diameter of the sections and being provided with an internal annular groove, means on the other of the said sections providing a radially outwardly projecting flange on the end of the section which flange is slidable within the forwardly projecting portion of the flange on the said one section toward engagement with the said end of the said one section, an annular coil spring embracing said other section adjacent its flange, and a longitudinally movable sleeve on said other section having a tapered end which is engageable with the spring and adapted to expand the same radially outwardly into the groove on the forwardly projecting portion of the flange on the said one section, the said sleeve being provided with an external annular groove arranged to cooperate with the flange on the said other section to support the expanded spring partly within the said internal annular groove but with at least one-half of the cross-section of the spring disposed outside of the said internal annular groove to prevent relative movement of the two pipe sections until the sleeve is disengaged from the spring.

4. A quick disconnect coupling for securing the ends of two pipe sections or the like and comprising means providing a flange on one section which has a radially outwardly projecting portion adjacent the end of the said one section and a portion projecting forwardly of the said end, the forwardly projecting portion of the flange having an inner diameter greater than the diameter of the sections and being provided with an internal annular groove, means on the other of the said sections providing a radially outwardly projecting flange on the end of the section which is slidable within the forwardly projecting portion of the flange on the said one section toward engagement with the said end of the said one section, an annular coil spring embracing said other section adjacent its flange, and a longitudinally movable sleeve on said other section having a front end tapered portion which is adapted to engage and expand the spring into said groove, and the said sleeve having a portion adjacent and rearwardly of the tapered portion defining an external annular groove arranged to cooperate with the flange on the said other section to support the expanded spring partly within the said internal annular groove but with at least one-half of the cross-section of the spring disposed outside of the said internal annular groove to prevent relative movement of the two pipe sections until the sleeve is disengaged from the spring.

5. A quick disconnect coupling for securing the ends of two pipe sections or the like and comprising a flange on one section which has a radially outwardly projecting portion adjacent the end of the said one section and a portion projecting forwardly of the said end, the said flange being counterbored to define an annular chamber around the said one end and to provide an inner diameter on the forwardly projecting portion of the flange which is greater than the diameter of the sections, and the forwardly projecting portion of the said flange being provided with an internal annular groove, a seal disposed in said annular chamber, a flange on the other of the said sections at the end thereof which flange projects radially outwardly and is slidable within the forwardly projecting portion of the first mentioned flange into engagement with the said seal, an annular coil spring embracing said other section rearwardly of its flange, and a longitudinally movable sleeve on said other section which is adapted to engage and to expand the said spring and which is provided with an external annular groove arranged to cooperate with the flange on said other section to support the expanded spring partly within the said internal annular groove but with at least one-half of the cross-section of the spring disposed outside of the said internal annular groove to prevent relative movement of the two pipe sections until the sleeve is disengaged from the spring.

6. A quick disconnect coupling for securing the ends of two pipe sections or the like and comprising a flange on one section which has a radially outwardly projecting portion adjacent the end of the said one section and a portion projecting forwardly of the said end, the said flange being counterbored to define an annular chamber around the said one end and to provide an inner diameter on the forwardly projecting portion of the flange which is greater than the diameter of the sections, and the forwardly projecting portion of the said flange being provided with an internal annular groove, a seal disposed in said annular chamber, a flange on the other of the said sections at the end thereof which flange projects radially outwardly and is slidable within the forwardly projecting portion of the first mentioned flange into engagement with the said seal, an annular coil spring embracing said other section rearwardly of its flange, and a longitudinally movable sleeve on said other section having a tapered front end which is adapted to engage and to expand the spring into engagement with the said groove arranged to cooperate with the flange on the said other section to support the expanded spring partly within the said internal annular groove but with at least one-half of the cross-section of the spring disposed outside of the said internal annular groove to prevent relative movement of the two pipe sections until the sleeve is disengaged from the spring.

References Cited in the file of this patent

UNITED STATES PATENTS

| | | |
|---|---|---|
| 1,734,236 | Smith | Nov. 5, 1929 |
| 2,111,956 | Baldwin | Mar. 22, 1938 |
| 2,452,430 | Clark | Oct. 26, 1948 |
| 2,757,942 | Eberhart | Aug. 7, 1956 |
| 2,828,982 | Kennedy | Apr. 1, 1958 |

FOREIGN PATENTS

| | | |
|---|---|---|
| 405,461 | Italy | Aug. 14, 1943 |